Nov. 18, 1952     E. J. WELLAUER     2,618,136
FLEXIBLE SHAFT COUPLING WITH OVERLOAD RELEASE
Filed July 30, 1945
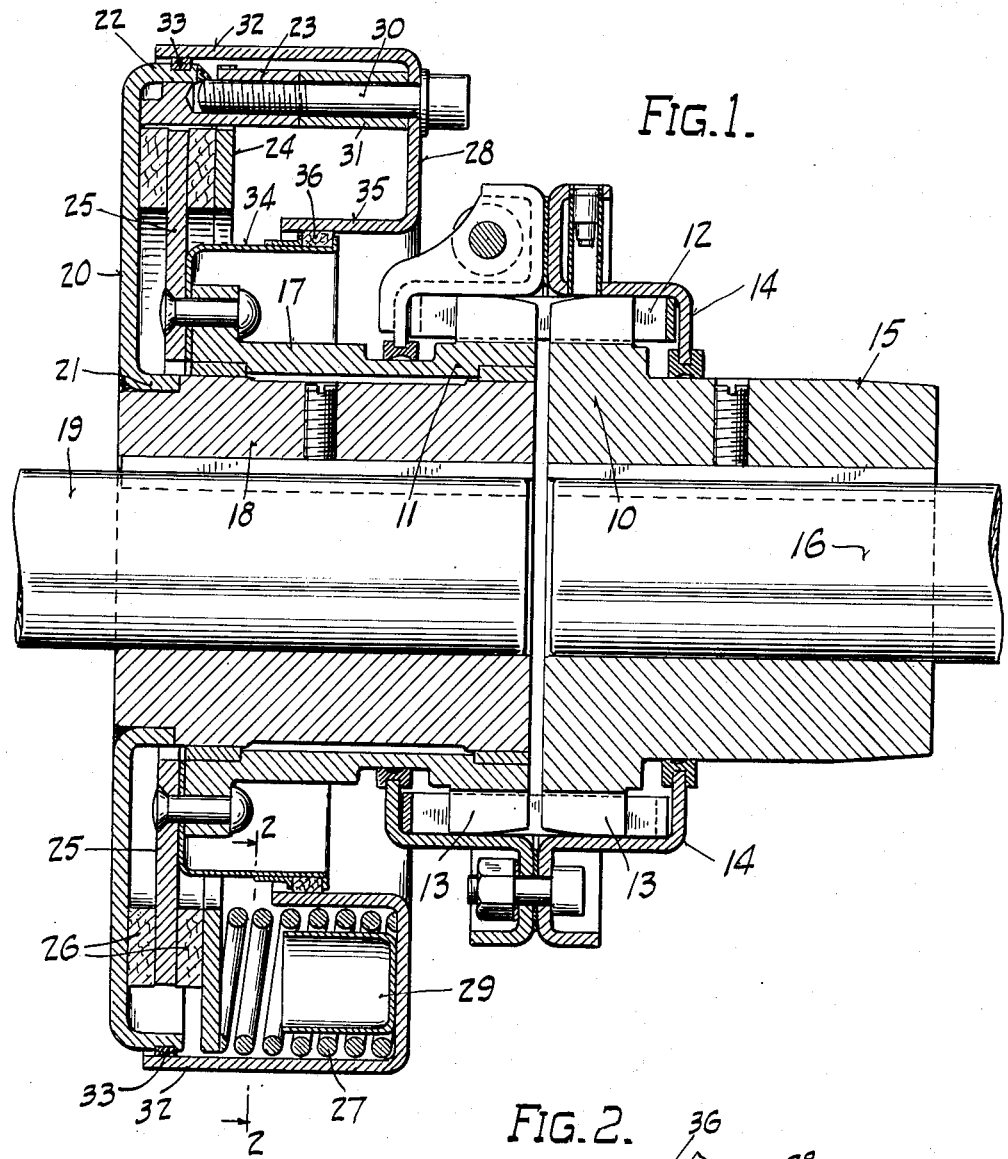
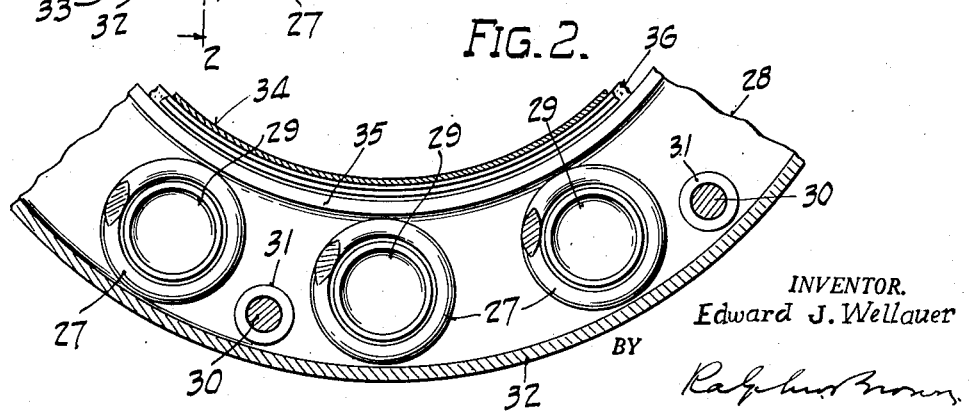
INVENTOR.
Edward J. Wellauer
BY
Ralph Brown
ATTORNEY.

UNITED STATES PATENT OFFICE 2,618,136

FLEXIBLE SHAFT COUPLING WITH OVERLOAD RELEASE

Edward J. Wellauer, Wauwatosa, Wis., assignor to The Falk Corporation, Milwaukee, Wis., a corporation of Wisconsin Application July 30, 1945, Serial No. 607,705

2 Claims. (Cl. 64—15)

This invention relates to power transmission couplings of the controlled torque type wherein provision is made for protecting the same against excessive torque loads.

One object of the present invention is to simplify and otherwise improve the construction and operation of clutches of this type.

Another object is to provide a flexible coupling having torque limiting means of simple and sturdy yet light weight design.

Another object is to provide an improved torque controlled flexible coupling in which all coacting parts are protected against the admission of dust and other foreign matter thereto.

Other more specific objects and advantages will appear, expressed or implied, from the following description of an illustrative embodiment of the present invention.

In the accompanying drawings:

Figure 1 is an axial sectional view of a torque controlled coupling constructed in accordance with this invention.

Figure 2 is a fragmentary sectional view taken substantially along the line 2—2 of Fig. 1.

The torque controlled coupling shown includes a flexible coupling, such as shown in the Schmitter Patent No. 2,181,537, having two toothed members 10 and 11 torsionally connected by an encircling resilient grid-like structure 12 interengaged with the teeth 13 of both members. The grid-like structure 12 is confined within a dust-excluding, lubricant retainer housing 14 encircling and loosely supported by both sets of teeth 13 so as to permit a limited angular, lateral and axial displacement between the members 10, all in the manner fully described in said patent.

In this instance the member 10 is shown equipped with an integral hub portion 15 keyed or otherwise fixed to one shaft 16, while the other member 11 is shown provided with an integral sleeve 17 journalled on a hub 18 keyed or otherwise fixed to an aligned shaft 19. The sleeve 17 and hub 18 are torsionally connected through a yieldable torque transmitting connection preferably such as will now be described.

The torque transmitting connection shown includes a disk 20 welded or otherwise fixed to the outer end of the hub 18. The disk 20 preferably comprises a sheet metal stamping perforated and flanged, as at 21, to seat on the end of hub 18, and having a peripheral flange 22 which provides secure anchorage for a series of laterally projecting lugs 23 welded thereto and to the face of the disk. The lugs 23 extend through a peripherally slotted ring 24 in a manner to permit the latter to float toward and from the disk 20 while preventing relative rotation therebetween.

A second disk 25, riveted or otherwise fixed to the end of the sleeve 17, is normally frictionally gripped by and between the disk 20 and ring 24 under pressure applied to the face of the latter preferably in a manner to be later described. The disk 25 is shown faced on both sides with suitable friction material 26 for contact with the disk 20 and ring 24.

In this instance pressure against the ring 24 is maintained by a circular series of coiled springs 27 confined within an annular housing 28. Each spring 27 is shown seated against the ring 24 and positioned in the housing 28 by a cup shaped centering element 29 within the spring and welded or otherwise fixed to the housing. The housing 28 is supported by a circular series of screws 30, each extending laterally therethrough and threaded into one of the lugs 23. The arrangement is such that by tightening the several screws 30, the housing 28 may be drawn toward the disk 20 to thereby increase the pressure of the contained springs 27 against the ring 24.

It is of course understood that the total pressure exerted by the several springs 27 determines the maximum torque that can be transmitted, without slip, from the disk 25 to the ring 24 and disk 20, and consequently the maximum torque that can be transmitted to or from the flexible coupling through the sleeve 17 and head 18. With this arrangement the coupling is thus protected against torques in excess of that maximum.

In order to protect the coupling against torque in excess of its rated capacity provision is preferably made for limiting the amount of pressure developed by the screws 30 and springs 27. In the device shown this is accomplished by the use of suitable stops in the form of spacer sleeves 31, each mounted on one of the screws 30 in position to positively limit the advance of the housing 28 toward the disk 20.

In order to protect the friction mechanism above described against dust or other foreign matter that might effect the otherwise reliable functioning thereof, the outer wall 32 of the housing 28 is preferably extended into overlapping relation with the peripheral flange 22 of the disk 20, and an appropriate sealing ring 33 is interposed therebetween. For this purpose a cylindrical shield 34 is also provided, carried by the sleeve 17 and overlapping the inner wall 35 of the housing 28 with an appropriate sealing ring 36 interposed therebetween.

Various changes may be made in the embodiment of the invention hereinabove specifically described without departing from or sacrificing the advantages of the invention as defined in the appended claims.

I claim:

1. In a power transmission coupling the combination of a pair of flexibly connected coupling members, one of said members having means for attachment to a shaft, means fixing the other of said members in concentric relation to a second shaft, a disk connected to the other of said members, a second disk frictionally engaged with said first named disk and having means for attachment to said second shaft, a plurality of springs for maintaining pressure between said disks to thereby provide a frictional torque transmitting connection therebetween, and an annular carrier for said springs, said carrier being carried by one of said disks and adjustable to vary the tension in said springs to thereby regulate the pressure between said disks.

2. In a power transmission coupling the combination of a pair of flexibly connected coupling members, one of said members having means for attachment to a shaft, means fixing the other of said members in concentric relation to a second shaft, a disk connected to the other of said members, a second disk frictionally engaged with said first named disk and having means for attachment to said second shaft, an annular housing carried by one of said disks and enclosing said other disk, a plurality of springs in said housing reacting on said disks to maintain pressure between said disks, said housing reacting on said springs and adjustable to vary the tension therein to thereby regulate the pressure between said disks, and means for limiting the adjustment of said housing to thereby limit the pressure between said disks.

EDWARD J. WELLAUER.

REFERENCES CITED

The following references are of record in the file of this patent:

UNITED STATES PATENTS

| Number | Name | Date |
|---|---|---|
| 1,505,480 | Manville | Aug. 19, 1924 |
| 1,807,210 | Hinnekens | May 26, 1931 |
| 1,815,621 | Hutchinson | July 21, 1931 |
| 2,027,842 | Schmitter et al. | Jan. 14, 1936 |
| 2,346,432 | Heintz | Apr. 11, 1944 |
| 2,391,438 | Muir | Dec. 25, 1945 |

FOREIGN PATENTS

| Number | Country | Date |
|---|---|---|
| 2,116 | Great Britain | of 1888 |
| 15,435 | Great Britain | of 1912 |
| 431,026 | Great Britain | 1935 |